E. BARTELS.
PROCESS OF EXTINGUISHING FIRES.
APPLICATION FILED MAY 25, 1911.
1,115,887.
Patented Nov. 3, 1914.
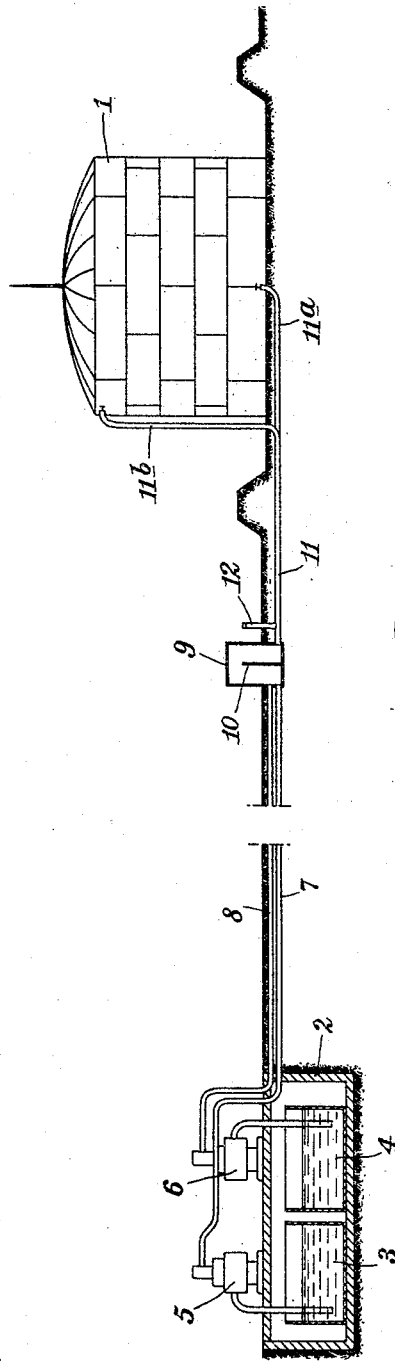
WITNESSES:
John Murtagh
L. J. Murphy
INVENTOR
Ernst Bartels
BY Goepel & Goepel
ATTORNEYS.

UNITED STATES PATENT OFFICE.

ERNST BARTELS, OF HARBURG-ON-THE-ELBE, GERMANY, ASSIGNOR TO THE FIRM OF PATENTIRTES SCHAUMLÖSCHVERFAHREN PERFECT GESELLSCHAFT M. B. H., OF BERLIN, GERMANY.

PROCESS OF EXTINGUISHING FIRES.

1,115,887.     Specification of Letters Patent.     Patented Nov. 3, 1914.

Application filed May 25, 1911. Serial No. 629,320.

*To all whom it may concern:*

Be it known that I, ERNST BARTELS, a subject of the German Emperor, and residing at Harburg-on-the-Elbe, Germany, have invented certain new and useful Improvements in Processes of Extinguishing Fires, of which the following is a specification.

The subject-matter of my invention is an improved process of extinguishing fires, use being made of the foam extinguishing-process which has recently become known. In this known process two liquids are first kept separate in suitable manner, and then mixed and produce gas, a material forming foam, e. g., extract of licorice root, being added to one or both liquids, so that when the two liquids are mixed a foam lasting for a long time is formed which is ejected under the influence of the gas, generally carbonic acid gas, formed in the extinguishing apparatus and thrown on the fire to be extinguished. This known process has proved exceedingly successful in small manual fire-extinguishing apparatus, but the employment of this foam extinguishing-process in large fire-extinguishing plants and, particularly, in the case of tanks for storing petroleum, benzin, benzole, and other readily combustible liquids, has considerable difficulties attached to it, principally because there were difficulties to be overcome before carrying into practice the idea of conveying the foam under the pressure of gas as in the known manual extinguishing apparatus of this kind, inasmuch as in a large fixed plant the foam can be conveyed solely in pipes which, however, so greatly impede the foam that either the foam is itself dissolved and condensed into a liquid whose fire-extinguishing action in such cases is equal to zero, or at the end of the pipe pressure cannot be said to exist at all and, consequently, the foam cannot be spread about to the necessary extent at the fire.

A primary object of my invention is to obviate all these difficulties by an improved fire-extinguishing plant, in which the foam extinguishing-process is employed. To this end, the two liquids are not first mixed, as heretofore, in order to form the foam which is then conducted farther, but the two liquids for generating gas and forming foam are conveyed apart from one another in narrow pipes into proximity of the place of employment and here enter into a mixing pot, so that the mixing of the two liquids and the formation of gas and foam first occur in this mixing pot, whereupon the foam can be conducted from the mixing pot under the influence of the pressure of the gas to the place of employment, e. g. to a tank. The conveyance of the foam is dependent not only on the pressure of the gas which is produced in the mixing pot in consequence of the two liquids being mixed, but also on the pressure at which the two liquids are supplied separately, i. e. in separate pipes by means of pumps or similar auxiliary means, to the mixing pot. Consequently, in this form of a stationary fire-extinguishing plant the foam can be removed from the mixing pot at a much greater pressure than was heretofore possible in such plants. The construction of this stationary fire-extinguishing plant can be modified in various ways without departing from the scope of the invention.

One form of apparatus suitable for carrying my process into practice is diagrammatically represented by way of example in the accompanying drawing in elevation, partly in section.

Referring to the drawing, the numeral 1 designates a tank or holder such as is used for storing benzin, petroleum, benzole and other readily combustible liquids. At a certain distance from this tank or from a number of such tanks I provide either in a pit 2 or in a building provided specially therefor, or at any other suitable place, a tank 3 and a second tank 4 which may stand beside one another or, if desired, at a certain distance from one another; these tanks 3, 4 containing the two liquids, one a solution of bicarbonate of soda, the other a suitable acid, which when mixed form a gas, e. g. carbonic acid gas, and one or the other liquid, or both, contains or contain a foam-producing substance, e. g. extract of licorice root, so that when the liquids are mixed a foam lasting a long time is produced. When a fire occurs the liquids are supplied from these two tanks 3, 4 by means of pumps 5, 6, or other suitable means, through narrow pipes 7, 8 to a mixing pot 9 in the proximity of the tank 1. This mixing pot may be of any desired construction. It suffices when a closed vessel contains a partition 10 forming two chambers which communicate above the partition one with another. The two liquids supplied by the pipes 7, 8 enter into the one chamber and are here intimately mixed one with the other so that not only is gas, e. g. carbonic acid gas, formed in a manner well known, but foam is simultaneously formed which rolls over the top edge of the partition 10, passes into the second compartment of the mixing pot 9 and is conducted away thence by means of a pipe 11 of larger diameter. The foam formed in this manner may be employed in various ways without departing from the scope of the invention. In the drawing it is assumed that one branch pipe 11$^a$ opens from below into the tank 1 in such manner that the foam supplied through the pipe rises in consequence of its small specific weight through the liquid in the tank and collects on its surface in the form of a layer of foam and then, as is known, extinguishes the fire in consequence of its preventing oxygen being supplied. The foam may however be supplied through a second pipe 11$^b$ from above into the tank 1. Or the pipes 11$^a$ and 11$^b$ may be used either together or only singly. In addition, however, the foam may be removed from the pipe 11 by means of one or more hydrants 12 and ejected with the aid of pipes and hose attached thereto. Obviously, the pipe 11 may have any suitable branches and lead to various places in order to enable the foam to be used generally.

As mentioned in the introduction, the described arrangement of the extinguishing plant has the advantage that, in consequence of the two liquids requisite for the formation of foam and gas being supplied separately, the formation of foam takes place only in proximity of its place of employment, so that the pressure of the gas produced in the mixing pot can itself more effectively eject the foam at the place of employment. An additional and, perhaps, more important advantage however is that in this form of the plant the pressure of the gas produced when the liquids are mixed is not the sole factor on which the conveyance and ejection of the foam is dependent, but the pressure produced by the pumps 5, 6, by which the liquids are first sent separately into the mixing pot 9, effectively aids this pressure of gas, so that a higher pressure is operative at the place of employment. Consequently, the foam for extinguishing the fire can be effectively employed at the burning articles or liquids, so that in quite a short time the burning layer of liquid in the tank 1 is covered sufficiently with foam and the fire is rapidly extinguished in consequence of the supply of oxygen being cut off.

Instead of supplying the foam to the burning articles the described process can obviously be carried into practice with equal success by supplying the two liquids for producing the pressure of the gas or forming the foam in separate pipes to the burning tank, and only mixing them at the fire, so that the foam is first formed here. In this mode of carrying my process into practice the mixing pot 9 may be omitted and the two pipes 7, 8 may be directly led to and open into the tank 1 in such manner that the two liquids enter into the tank separately and are only mixed one with the other for example at the surface or at the bottom of the liquid in the tank, so that foam is first formed here.

The two liquids can also be employed on a smaller scale, e. g. in motor-boats, the liquids being poured in succession into the hold of the boat in which, for example, spilt benzin is burning. But as the formation of foam for extinguishing the fire is of primary importance, my process is of special advantage for stationary plants.

I claim:—

The process herein described of extinguishing fires, which consists in separately supplying two liquids capable of generating a gas and producing foam when mixed together, mixing them in a closed vessel located in proximity to the tank to be protected, conducting the mixture under pressure and without access of air to the interior of the tank, and ejecting the mixture therein by the pressure of the gas generated by the mixture.

In testimony, that I claim the foregoing as my invention, I have signed my name in presence of two subscribing witnesses.

ERNST BARTELS.

Witnesses:
 HENRY HASPER,
 WOLDEMAR HAUPT.

Copies of this patent may be obtained for five cents each, by addressing the "Commissioner of Patents, Washington, D. C."